(12) United States Patent
Byeon

(10) Patent No.: US 10,270,678 B2
(45) Date of Patent: Apr. 23, 2019

(54) SYSTEM INCLUDING MASTER DEVICE AND SLAVE DEVICE, AND OPERATION METHOD OF THE SYSTEM

(71) Applicant: SK hynix Inc., Gyeonggi-do (KR)

(72) Inventor: Sang-Jin Byeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 162 days.

(21) Appl. No.: 15/251,655

(22) Filed: Aug. 30, 2016

(65) Prior Publication Data

US 2018/0062968 A1   Mar. 1, 2018

(51) Int. Cl.
*H04L 12/26* (2006.01)
*H04L 29/06* (2006.01)

(52) U.S. Cl.
CPC .......... *H04L 43/16* (2013.01); *H04L 43/065* (2013.01); *H04L 43/08* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2007/0147478 A1* | 6/2007 | Lai | ......... | H04B 7/005 375/130 |
| 2015/0143007 A1* | 5/2015 | Fan | ......... | H04B 3/542 710/110 |

FOREIGN PATENT DOCUMENTS

| | | |
|---|---|---|
| KR | 1020150022160 | 3/2015 |
| KR | 1020150048509 | 5/2015 |

* cited by examiner

*Primary Examiner* — Andre J Allen
(74) *Attorney, Agent, or Firm* — IP & T Group LLP

(57) ABSTRACT

A system includes: a master device; and a slave device including a temperature variation measuring circuit for measuring a temperature variation amount of the salve device for a predetermined time. The slave device transfers temperature information to a master device when a temperature variation amount for the predetermined time is equal to or greater than a threshold value, the temperature information representing that the temperature variation amount for the predetermined time is equal to or greater than the threshold value. The master device determines a temperature of the slave device in response to the temperature information, and controls the slave device based on the determined temperature of the slave device.

13 Claims, 3 Drawing Sheets

SYSTEM INCLUDING MASTER DEVICE AND SLAVE DEVICE, AND OPERATION METHOD OF THE SYSTEM

BACKGROUND

1. Field

Exemplary embodiments of the present invention relate to an electronic system including a master device and a slave device.

2. Description of the Related Art

As electronic systems such as computer systems come to have higher integration degree and higher-level performances, they consume more power. The increase in the power consumption causes more heat to he emitted in the electronic systems. Particularly, as the number of memories included in an electronic system is increased and the operation rates of a memory and a processor are increased, the amount of heat generated in the system is increased. More heat per area may be generated as the physical distance between the heat-emitting components, for example, between a processor and memories, becomes shorter in a system. When heat is generated following the operation of a component in a system, the generated heat may degrade the operation characteristics and sometimes may even cause an operation failure not only in the component itself and also in the other neighboring components as well. Therefore, managing heat emission in an electronic system is quite important.

SUMMARY

Embodiments of the present invention are directed to an improved system and method for more efficiently managing heat generation in an electronic system. The system may include a master device and a slave device wherein the master device may more effectively monitor a temperature and or a voltage change of the slave device.

According to an embodiment of the present invention, a system may include: a master device; and a slave device including a temperature variation measuring circuit for measuring a temperature variation amount of the salve device for a predetermined time. The slave device transfers temperature information to a master device when a temperature variation amount for the predetermined time is equal to or greater than a threshold value, the temperature information representing that the temperature variation amount for the predetermined time is equal to or greater than the threshold value. The master device determines a temperature of the slave device in response to the temperature information and controls the slave device based on the determined temperature of the slave device.

The temperature variation measuring circuit may include: a thermosensor for measuring the temperature of the slave device; a storage for periodically storing temperatures sensed by the thermosensor; and a variation amount calculator for deciding whether a temperature difference between a temperature of a previous period stored in the storage and a temperature of a present period is equal to or greater than the threshold value.

The system may further includes: a line provided between the slave device and the master device, for transferring the temperature information from the slave device to the master device.

The slave device may include a memory device, and the master device may include a memory controller.

The master device may control a refresh period of the memory device based on the determined temperature of the slave device.

The master device may control a workload of the memory device based on the determined temperature of the slave device.

According to another embodiment of the present invention, a system may include: a master device; and a slave device including a voltage variation measuring circuit for measuring a voltage variation amount of the salve device for a predetermined time. The slave device transfers voltage information to master device when a voltage variation amount for the predetermined time is equal to or greater than a threshold value, the voltage information representing that the voltage variation amount for the predetermined time is equal to or greater than the threshold value. The master device determines a voltage of the slave device in response to the voltage information, and controls the slave device based on the determined voltage of the slave device.

The voltage variation measuring circuit may include: a voltage sensor for measuring a voltage applied to the slave device; a storage for periodically storing voltages sensed by the voltage sensor; and a variation amount calculator for deciding whether a voltage difference between a voltage of a previous period stored in the storage and a voltage of a present period is equal to or greater than the threshold value.

The system may further includes: a line provided between the slave device and the master device, for transferring the voltage information from the slave device to the master device.

The slave device may include a memory device, and the master device may include a memory controller.

According to yet another embodiment of the present invention, a method for operating a system including a master device and a slave device may include: determining, by the slave device, whether a variation amount for one of temperature and voltage of a salve device for a predetermined time is equal to or greater than a threshold value; when the variation amount of the salve device for the predetermined time is equal to or greater than the threshold value, transferring to the master device, by the slave device, indication information representing that the variation amount for the predetermined time is equal to or greater than the threshold value; determining, by the master device, one of a temperature and a voltage of the slave device in response to the indication information; and controlling, by the master device, the slave device based on the determined one.

The determining of whether the variation amount for one of temperature and voltage of the slave device may include: periodically measuring the temperature of the slave device; and determining whether a temperature difference between a temperature of the slave device measured during a previous period and a temperature of the slave device measured during a present period is equal to or greater than the threshold value.

The slave device may include a memory device, and the master device includes a memory controller.

The controlling of the slave device may include controlling a refresh period of the memory device based on the temperature of the slave device.

The controlling of the slave device may include controlling a workload of the memory device based on the temperature of the slave device.

BRIEF DESCRIPTION OF THE DRAWINGS

These and other features and advantages of the present invention will become apparent from the following detailed description of the present invention in reference to the accompanying drawings in which.

DETAILED DESCRIPTION

Figure 1:
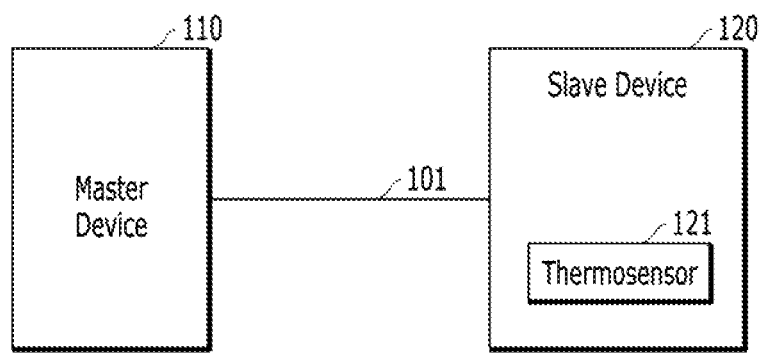
FIG. 1 is a block diagram illustrating a system including a master device and a slave device, according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are simplified schematics and are not necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context dearly indicates otherwise. It will be further understood that the terms "comprises", "comprising", "includes" and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present invention will be described in detail with reference to the attached drawings.

Referring now to FIG. 1, a system is provided according to an embodiment of the present invention.

The system may include a master device 110, a slave device 120, and a communication channel 101 operatively connecting the master device 110 and the slave device 120.

The master device 110 may control and use the slave device 120. The master device 110 may control and use the slave device 120 by using the communication channel 101. For example, signals including control signals and data may be exchanged between the master device 110 and the slave device 120.

In an embodiment, the master device 110 may be a memory controller, and the slave device 120 may be a memory device. When the master device 110 is a memory controller and the slave device 120 is a memory device, commands and addresses may be transferred from the master device 110 to the slave device 120 through the communication channel 101, and data may be exchanged between the master device 110 and the slave device 120 through the communication channel 101.

The slave device 120 may include a thermosensor 121 for measuring the temperature of the slave device 120. Any suitable thermosensor may be used.

The master device 110 may monitor the temperature of the slave device 120 for efficiently controlling the slave device 120. In an embodiment, a method is provided for the master 110 device to monitor the temperature of the slave device 120, the method comprising periodically transferring temperature information regarding the temperature sensed by the thermosensor 121 of the slave device 120 through the communication channel 101 to the mater device 110. This method, however, may bring about a deterioration or degradation in the performance of the system, because transfer of other signals, such as data, may have to be stopped or slowed down while the master device 110 receives the temperature information of the slave device 120 through the communication channel 101. For reducing the degradation in the system performance, the period for transferring the temperature information from the slave device 120 to the master device 110 may be lengthened. In this case, however, the monitoring accuracy of the temperature of the slave device 120 by the master device 110 may be compromised.

In order to make the master device 110 monitor the temperature of the slave device 120 without any substantial degradation in the system performance and also without compromising the monitoring accuracy, another channel (not shown) other than the communication channel 101 may be provided between the master device 110 and the slave device 120 for transferring the temperature information from the slave device 120 to the master device 110. Temperature information may be transmitted from the slave device 120 to the master device 110 in real-time through the second channel. Further, electronic circuits for transmitting and receiving the temperature information may be provided in both the slave device 120 and the master device 120, respectively. Because of the required transmitting/receiving circuits, production cost may be increased and more power may be consumed for transferring the temperature information.

Figure 2:
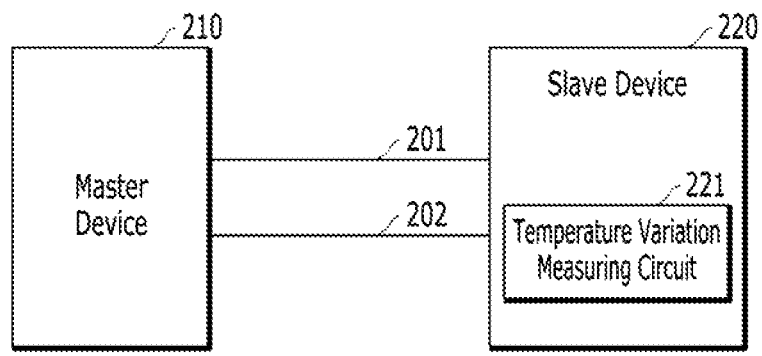
FIG. 2 is a block diagram illustrating a system including a master device and a slave device, according to another embodiment of the present invention.

FIG. 2 is a block diagram illustrating a system 200, according to another embodiment of the present invention.

The system 200 may include a master device 210, a slave device 220, a communication channel 201, and a line 202.

The master device 210 may control and use the slave device 220. It is noted, that the master-slave relationship between the master device 210 and the slave device 220 may be relative meaning that in a complex system a device may be a master device with respect to one other device and at the same time may be a slave with respect another device. For example, when a device A controls and uses a device B and the device B controls and uses a device C, the device B becomes a master device and the device C becomes a slave device in the relationship between the device B and the device C. In the relationship between the device A and the device B, however, the device A becomes a master device and the device B becomes a slave device. Hence, the device B may be a master device with respect to device C and may be a slave device with respect to device A.

For example, in a system including a processor having a memory controller and a memory module having a plurality of memory chips, the processor may be a master device and the memory module may be a slave device, because the processor controls and uses the memory module. If, now, the memory module also includes a module-type control chip for controlling the memory chips, the module-type control chip becomes a master device, and the memory chips become slave devices in the inside of the memory module.

The slave device 220 may communicate with the master device 210 through the communication channel 201. When the master device 210 includes a memory controller, and the slave device 220 includes a memory device, commands and addresses may be transferred from the master device 210 to the slave device 220 through the communication channel 201, and data may be exchanged between the master device 210 and the slave device 220. The communication channel 201 may include one or more lines.

The slave device 220 may include a temperature variation measuring circuit 221 for measuring changes in the temperature of the slave device 220. When the temperature variation measuring circuit 221 of the slave device 220 detects a temperature variation during a predetermined time that is equal to or greater than a threshold value, the slave device 220 may inform the master device 210 of the change in the temperature of the slave device 220 through the line 202. Hence, only when the temperature variation of the slave device 220 during a predetermined time is equal to or greater than a threshold value, the slave device 220 informs the master device 210 of the change in its temperature through the line 202, because only then the master device 210 needs to check the temperature of the slave device 220.

When the master device 210 is informed that the temperature variation for the predetermined time is equal to or greater than the threshold value, the master device 210 may then check the temperature of the slave device 220 through the communication channel 201. Since the master device 210 uses the communication channel 201 to check the temperature of the slave device 220 the transfer of other signals, such as data through the communication channel 201 may be stopped. However, when the slave device 220 comes to inform the master device 210 of its temperature change, checking the temperature of the slave device 220 may be more important than transferring the signals, such as data through the communication channel 201. The master device 210, then, may control the slave device 220 based on the temperature of the slave device 220 that is checked out through the communication channel 201.

Figure 3:
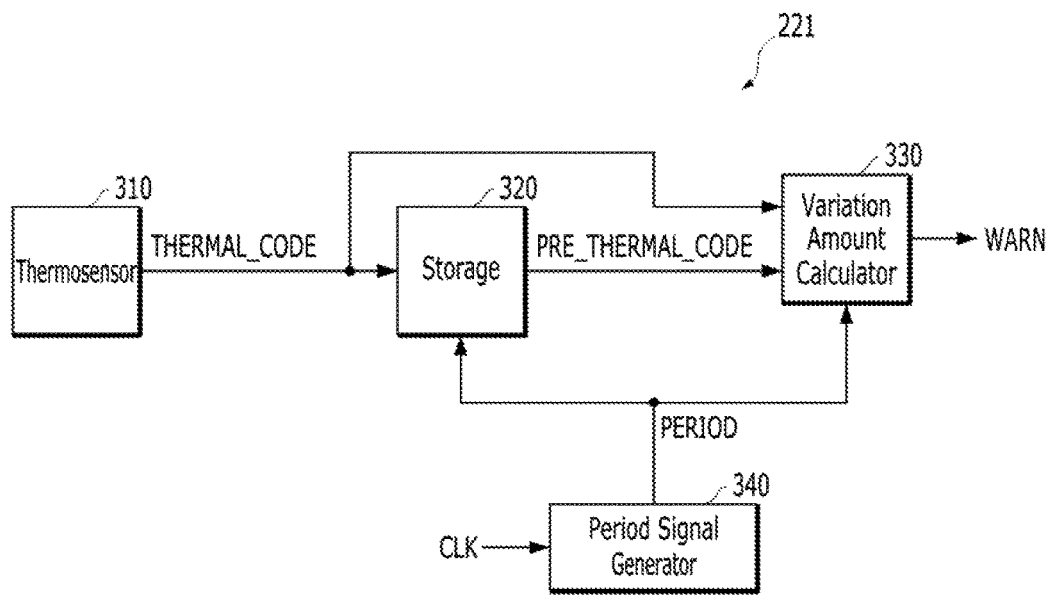
FIG. 3 is a block diagram illustrating a temperature variation measuring circuit shown in FIG. 2.

FIG. 3 is a block diagram illustrating an example configuration of the temperature variation measuring circuit 221 shown in FIG. 2.

Referring to FIG. 3, the temperature variation measuring circuit 221 may include a thermosensor 310, a storage 320, a variation amount calculator 330, and a period signal generator 340.

The thermosensor 310 may measure the temperature of the slave device 220 and generate a thermal code THERMAL_CODE indicating the measured level of the temperature. For example, the thermal code THERMAL_CODE may be a multi-bit signal.

The period signal generator 340 may generate a period signal PERIOD based on a clock CLK. The period signal generator 340 may enable the period signal PERIOD every time the clock CLK is enabled a predetermined number of times. For example, when the predetermined number of times is 1000, the period signal generator 340 may enable the period signal PERIOD once whenever the clock CLK is enabled 1000 times. When the predetermined number of times is 100, the period signal generator 340 may enable the period signal PERIOD once whenever the clock CLK is enabled 100 times. For example, the clock CLK may be used for a synchronized operation of the slave device 220. In an embodiment, the clock CLK may be generated in the inside of the slave device 220. Alternatively, the clock CLK may be received from the exterior of the slave device 220.

The storage 320 may periodically receive and store the thermal code THERMAL_CODE that is outputted from the thermosensor 310 in response to the period signal PERIOD. The storage 320 may output a previous thermal code PRE_THERMAL_CODE that is received during the previous period and stored therein.

The variation amount calculator 330 may be enabled in response to the period signal PERIOD. When the variation amount calculator 330 is enabled, it may compare the thermal code THERMAL_CODE received from the thermosensor 310 with the previous thermal code PRE_THERMAL_CODE that is received from the storage 320. The variation amount calculator 330 may compare the temperature of the present period with the temperature of the previous period. As a result of the temperature comparison performed in the variation amount calculator 330, when the difference between the temperature of the present period and the temperature of the previous period is equal to or greater than a threshold value, the variation amount calculator 330 may enable a warning signal WARN. The threshold value may vary depending upon the design of the specific electronic system. For example, the threshold value may be set to about 1, 5 or 10° C. In an embodiment, the threshold value may be 10° C.

As a result of the temperature comparison performed in the variation amount calculator 330, when the difference between the temperature of the present period and the temperature of the previous period is less than the threshold value, the warning signal WARN may be disabled.

The warning signal WARN may be transferred to the roaster device 210 through the line 202 Upon receipt of the enabled warning signal, the master device 220 may then check the temperature of the slave device.

Figure 4:
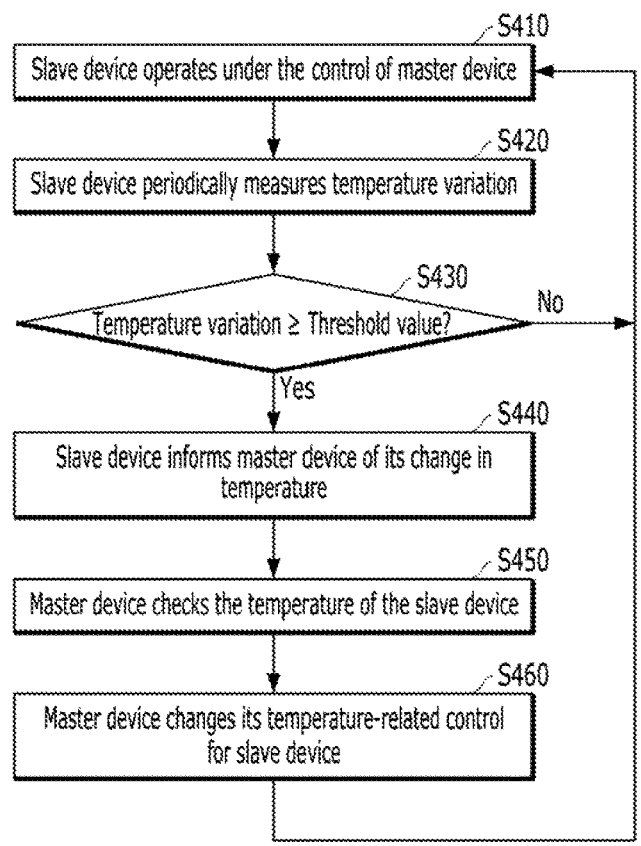
FIG. 4 is a flowchart illustrating an operation of the system shown in FIG. 2.

FIG. 4 is a flowchart illustrating an operation of the system shown in FIG. 2.

Referring to FIG. 4, in step S410, the slave device 220 may operate under the control of the master device 210. For example, when the master device 210 is a memory controller, and the slave device 220 is a memory device, the memory device may perform operations such as a read or write operation under the control of the memory controller.

In step S420, while the slave device 220 performs an operation, the slave device periodically measures the temperature variation in the slave device 220 for a predetermined time. When the variation in the temperature of the slave device 220 for the predetermined time is equal to or greater than a threshold value (Y in step S430), the slave device 220 may inform the master device 210 that there is a great variation in the temperature of the slave device 220 in step S440. The master device 210 may be informed of the great variation in the temperature of the slave device 220 as the warning signal WARN transferred from the slave device 220 to the master device 210 through the line 202 is enabled.

Upon reception of the enabled warning signal WARN, the master device 210 may check the temperature of the slave device 220 in step S450. Checking the temperature of the slave device may include the master device 210 requesting the slave device 220 for temperature information through the communication channel 201 and receiving the temperature information from the slave device 220 through the communication channel 201.

The master device 210 may change its temperature-related control for the slave device 220 based on the received temperature information of the slave device 220 in step S460. In an embodiment, the change in the temperature-related control may include changing a refresh period and/or controlling the workload. For example, if the temperature of the slave device 220 is high, the refresh period may be controlled to be shorter and the workload on the slave device 220 may be reduced. The workload on the slave device 220 may be reduced by assigning an operation which is to be performed in the slave device 220 to another device. Alternatively, the workload on the slave device 220 may be reduced by increasing the time interval between successive operations performed by the slave device 220 longer. When the temperature of the slave device 220 is too high, the master device 210 may temporarily stop the operation of the slave device 220. After the master device 210 changes its control for the slave device 220 in relation to the temperature of the slave device 210, the slave device 220 may operate again according to the control of the master device 210 in step S410.

As described above, the master device 210 checks out the temperature of the slave device 220 through the communication channel 201 only when the variation in the temperature of the slave device 220 is equal to or greater than the threshold value. In other words, only when it is necessary to check the temperature of the slave device 220, the master device 210 checks out the temperature of the slave device 220. Therefore, it is possible to prevent degradation in the performance of the system that may be caused due to the checking out of the temperature of the slave device 220. Also, since the temperature of the slave device 220 is monitored every time the variation in the temperature of the slave device 220 is equal to or greater than the threshold value, the temperature of the slave device 220 may be monitored accurately whenever it needs to be and according to the design needs of a particular electronic system FIG. 5 is a block diagram illustrating a system according to yet another embodiment of the present invention.

Figure 5:
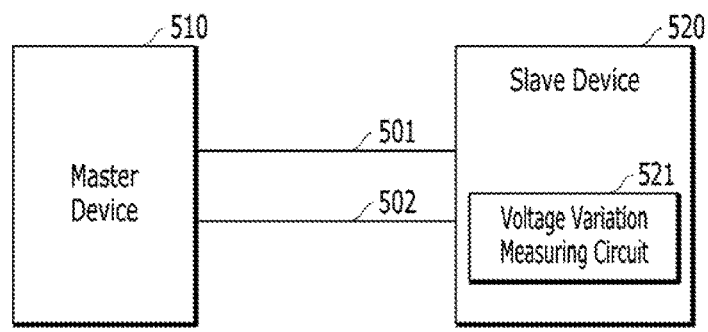
FIG. 5 is a block diagram illustrating a system including a master device and a slave device, according to yet another embodiment of the present invention.

Referring to FIG. 5, the system may include a master device 510, a slave device 520, a communication channel 501, and a line 502. The system of FIG. 5 is different from the system of FIG. 2 in that the master device 510 monitors the voltage of the slave device 520 instead of the temperature of the slave device 520.

The slave device 520 may include a voltage variation measuring circuit 521 for measuring the amount of change in the voltage of the slave device 520. In an embodiment, the voltage may be a power source voltage applied to the slave device 520. When the voltage variation measuring circuit 521 of the slave device 520 detects a voltage variation for a predetermined time that is equal to or greater than a threshold value, the slave device 520 may inform the master device 510 of the change in the voltage of the slave device 520 through the line 502. Hence, only when the voltage variation of the slave device 520 for the predetermined time is equal to or greater than the threshold value, the slave device 520 informs the master device 510 of the change in its voltage through the line 502. The threshold voltage value may be set to ensure that the slave device 520 informs the master device 510 of a change in its voltage through the line 502 only when needed. The master device 510 may then check the voltage of the slave device 520 and may modify the control of the slave device as may be needed.

When the master device 510 is informed that the voltage variation for the predetermined time is equal to or greater than the threshold value, the master device 510 may check the voltage of the slave device 520 through the communication channel 501. The master device 510 may control the slave device 520 based on the voltage of the slave device 520 that is checked out through the communication channel 501. For example, when the voltage of the slave device 520 is excessively low, the master device 510 may operate the slave device 520 at a lower speed. When the voltage of the slave device 520 is excessively high, the master device 510 may suspend the operation the slave device 520 in order to protect the slave device 520.

The system shown in FIG. 5 may operate similarly in comparison to the operation as illustrated in FIG. 4, except that the master device 510 monitors the voltage of the slave device 520 instead of the temperature of the slave device 520 and controls the slave device 520 not based on the monitored temperature information but based on the monitored voltage information.

Figure 6:
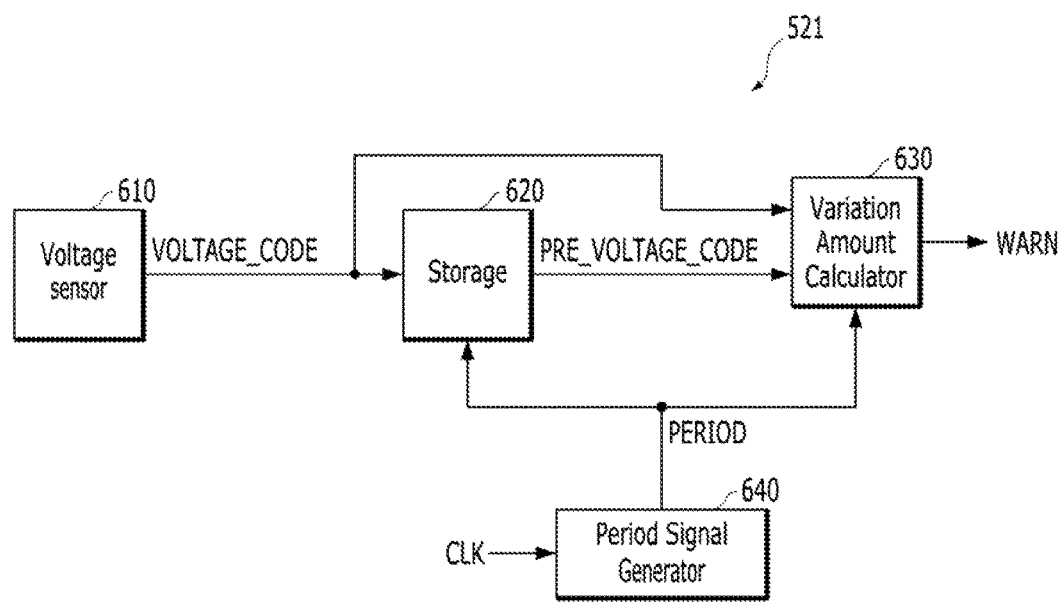
FIG. 6 is a block diagram illustrating a voltage variation measuring circuit shown in FIG. 5.

FIG. 6 is a block diagram illustrating an example configuration of the voltage variation measuring circuit 521 shown in FIG. 5.

Referring to FIG. 6, the voltage variation measuring circuit 521 may include a voltage sensor 610, a storage 620, a variation amount calculator 630, and a period signal generator 640.

The voltage sensor 610 may measure the level of a power source voltage applied to the slave device 520 and generate a voltage code VOLTAGE_CODE indicating the measured level of the power source voltage. For example, the voltage code VOLTAGE_CODE may be a multi-bit signal.

The period signal generator 640 may generate a period signal PERIOD based on a clock CLK. The period signal generator 640 may enable the period signal PERIOD every time the clock CLK is enabled a predetermined number of times. For example, when the predetermined number of times is 1000, the period signal generator 640 may enable the period signal PERIOD once whenever the clock CLK is enabled 1000 times. When the predetermined number of times is 100, the period signal generator 640 may enable the period signal PERIOD once whenever the clock CLK is enabled 100 times. For example, the dock CLK may be used for a synchronized operation of the slave device 520. In an embodiment, the clock CLK may be generated in the inside of the slave device 520. Alternatively, the clock CLK may be received from the exterior of the slave device 520.

The storage 620 may periodically receive and store the voltage code VOLTAGE_CODE that is outputted from the voltage sensor 610 in response to the period signal PERIOD. The storage 620 may output a previous voltage code PRE_VOLTAGE_CODE that is received during the previous period and stored therein.

The variation amount calculator 630 may be enabled in response to the period signal PERIOD. When the variation amount calculator 630 is enabled, it may compare the voltage code VOLTAGE_CODE received from the voltage sensor 610 with the previous voltage code PRE_VOLTAGE_CODE that is received from the storage 620. In other words the variation amount calculator 630 may compare the voltage of the present period with the voltage of the previous period. As a result of the voltage comparison performed in the variation amount calculator 630, when the difference between the voltage of the present period and the voltage of the previous period is equal to or greater than a threshold value, the variation amount calculator 630 may enable a warning signal WARN. As a result of the voltage comparison performed in the variation amount calculator 630, when the difference between the voltage of the present period and the voltage of the previous period is less than the threshold value the warning signal WARN may be disabled. The warning signal WARN may be transferred to the master device 510 through the line 502.

According to the embodiments of the present invention, a master device may effectively monitor a slave device for a change in temperature and or a voltage in a system including the master device and the slave device.

While the present invention has been described with respect to the specific embodiments, it will be apparent to those skilled in the art that various changes and modifications may be made without departing from the spirit and scope of the invention as defined in the following claims.

What is claimed is:

1. A system, comprising:
   a master device; and
   a slave device including a temperature variation measuring circuit measuring a temperature variation of the slave device during a predetermined time, the slave device being transmitting to the master device a signal indicating that the temperature variation during the predetermined time is equal to or greater than a threshold value,
   wherein the master device checks a temperature of the slave device in response to the signal transmitted from the slave device.

2. The system of claim 1, wherein the master device controls the slave device based on the determined temperature of the slave device.

3. The system of claim 2, wherein the temperature variation measuring circuit includes:
   a thermosensor measuring the temperature of the slave device;
   a storage periodically storing temperatures sensed by the thermosensor; and
   a variation amount calculator deciding whether a temperature difference between a temperature of a previous period stored in the storage and a temperature of a present period is equal to or greater than the threshold value.

4. The system of claim 1, further comprising:
   a line provided between the slave device and the master device, transferring the temperature from the slave device to the master device.

5. The system of claim 1, wherein the slave device includes a memory device, and the master device includes a memory controller.

6. The system of claim 3, wherein the master device controls a refresh period of the memory device based on the determined temperature of the slave device.

7. The system of claim 3, wherein the master device controls a workload of the memory device based on the determined temperature of the slave device.

8. A method for operating a system including a master device and a slave device, the method comprising:
   determining, by the slave device, whether a parameter variation of the slave device during a predetermined time is equal to or greater than a threshold value;
   transmitting, by the slave device, to the master device a signal indicating the parameter variation during the predetermined time is equal to or greater than the threshold value;
   determining, by the master device, the parameter of the slave device in response to the signal transmitted from the slave device; and
   controlling, by the master device, the slave device based on the determined parameter.

9. The method of claim 8, wherein the parameter is a temperature or a voltage of the slave device.

10. The method of claim 8, wherein the determining of the variation includes:
    periodically measuring parameter of the slave device; and
    determining whether a parameter difference between a parameter of the slave device measured during a previous period and a parameter of the slave device measured during a present period is equal to or greater than the threshold value.

11. The method of claim 8, wherein the slave device includes a memory device, and the master device includes a memory controller.

12. The method of claim 8, wherein the controlling of the slave device comprises: controlling a refresh period of the memory device based on the parameter of the slave device.

13. The method of claim 8, wherein the controlling of the slave device comprises:
    controlling a workload of the memory device based on the parameter of the slave device.

* * * * *